United States Patent [19]
Miyamoto

[11] Patent Number: 4,628,383
[45] Date of Patent: Dec. 9, 1986

[54] TAPE CASSETTE LOADING DEVICE IN A MAGNETIC RECORDING AND/OR REPRODUCING APPARATUS

[75] Inventor: Ritsu Miyamoto, Yokohama, Japan

[73] Assignee: Victor Company of Japan, Ltd., Yokohama, Japan

[21] Appl. No.: 573,874

[22] Filed: Jan. 25, 1984

[30] Foreign Application Priority Data

| Jan. 28, 1983 | [JP] | Japan | 58-13071 |
| Jan. 28, 1983 | [JP] | Japan | 58-13072 |
| Feb. 22, 1983 | [JP] | Japan | 58-24479[U] |
| Mar. 1, 1983 | [JP] | Japan | 58-34127 |
| Mar. 1, 1983 | [JP] | Japan | 58-30116[U] |
| Mar. 4, 1983 | [JP] | Japan | 58-31155[U] |

[51] Int. Cl.$^4$ .................. G11B 15/00; G11B 5/008
[52] U.S. Cl. .................. 360/96.5; 360/71; 360/85; 360/93
[58] Field of Search ............ 360/60, 71, 85, 93, 360/96.1, 96.5, 96.6, 132; 242/197-199

[56] References Cited

U.S. PATENT DOCUMENTS

| 3,829,033 | 8/1974 | Cousino | 360/93 X |
| 4,319,292 | 3/1982 | Katoh | 360/96.5 |
| 4,361,859 | 11/1982 | Shatteman | 360/96.5 |

FOREIGN PATENT DOCUMENTS

| 59-65966 | 4/1982 | Japan | 360/96.6 |
| 57-127954 | 8/1982 | Japan | 360/96.5 |
| 2039128 | 7/1980 | United Kingdom . |
| 2045995 | 11/1980 | United Kingdom . |

OTHER PUBLICATIONS

Patent Abstracts of Japan, vol. 4, No. 156 (P-34) [638], Oct. 31, 1980, p. 156 P34.
Patent Abstracts of Japan, vol. 5, No. 38 (P-52) [710], Mar. 12, 1981.

Primary Examiner—Stuart N. Hecker
Assistant Examiner—Benjamin E. Urcia
Attorney, Agent, or Firm—Michael N. Meller

[57] ABSTRACT

A tape cassette loading device comprises a cassette holder for accommodating and holding a tape cassette which is inserted therein, a guiding mechanism for guiding the cassette holder so that the cassette holder undergoes a predetermined movement, a driving mechanism which starts to operate when the tape cassette is inserted into the cassette holder, and a loading mechanism driven by the driving mechanism. The cassette holder is movable together with the inserted tape cassette between a cassette inserting position where the tape cassette is inserted and a predetermined loading position where a member of a recording and/or reproducing apparatus relatively enters within the tape cassette. This member is required to carry out recording and reproduction. The above predetermined movement includes in sequence a horizontal frontward movement of the cassette holder from the cassette inserting position, a subsequent obliquely upward movement of the cassette holder for avoiding the horizontal frontward movement from being interfered by the member, and a subsequent downward movement of the cassette holder to the predetermined loading position. The loading mechanism moves the cassette holder under guidance of the guiding mechanism to the predetermined loading position together with the tape cassette which is accommodated within the cassette holder.

9 Claims, 18 Drawing Figures

TAPE CASSETTE LOADING DEVICE IN A MAGNETIC RECORDING AND/OR REPRODUCING APPARATUS

BACKGROUND OF THE INVENTION

The present invention generally relates to tape cassette loading devices in magnetic recording and/or reproducing apparatuses, and more particularly to a tape cassette loading device applied to a magnetic recording and/or reproducing apparatus, which is designed so that a tape cassette is inserted from a front opening of the apparatus and loaded into a predetermined loading position inside the apparatus.

Generally, a cassette type magnetic recording and/or reproducing apparatus is designed to operate with a cassette which accommodates a magnetic tape (such a cassette will be hereinafter referred to as a tape cassette). In the present specification and the appended claims, a so-called tape cartridge is also included within the scope of the tape cassette. The tape cartridge or cassette is loaded into a predetermined position inside the apparatus. Then, the magnetic tape (cassette tape) is automatically drawn out of the tape cassette and is guided along a predetermined tape traveling path which passes a guide drum, by an automatic tape loading mechanism.

The above automatic tape loading mechanism and the tape cassette have been reduced to practice in video tape recorders. These video tape recorders have been marketed in a large number of countries, and the construction thereof is well known.

When loading the tape cassette into the video tape recorder, the tape cassette is lowered from above the predetermined loading position. Tape draw-out members which intercept the magnetic tape and load the magnetic tape into a predetermined tape traveling path, relatively enter inside the tape cassette as the tape cassette is lowered to the predetermined loading position. Conventionally, there was a tape cassette loading device having a cassette holder which is movable up and down. This cassette holder projected from the top plate of the video tape recorder. According to this conventional device, the tape cassette was loaded into the predetermined loading position, by inserting the tape cassette into the cassette holder which projects from the top plate of the video tape recorder, and then manually pushing the cassette holder down together with the tape cassette which is accommodated within the cassette holder.

Recently, a so-called front-loading type video tape recorder has been developed. In the video tape recorder of this type, the tape cassette is partly inserted through an inserting opening which is located in the front of the video tape recorder. The partly inserted tape cassette is automatically drawn inside the video tape recorder, and is loaded into the predetermined loading position by a front-loading type tape cassette loading device.

Examples of the conventional front-loading type tape cassette loading device may be found in the U.S. Pat. Nos. 4,379,313 and 4,320,424. According to the tape cassette loading devices which are disclosed in these patents, the tape cassette which is partly inserted through the inserting opening in the front of the video tape recorder is first moved horizontally and is subsequently moved vertically, as will be described later on in the specification. Thus, there was a problem in that it was difficult to reduce the height dimension of the video tape recorder or design a thin-type video tape recorder. Presently, various means are being devised to reduce the thickness (height) of the video tape recorder. However, it will be extremely difficult to effectively reduce the thickness of the video tape recorder, unless the thickness of the tape cassette loading device is reduced.

SUMMARY OF THE INVENTION

Accordingly, it is a general object of the present invention to provide a novel and useful tape cassette loading device in a magnetic recording and/or reproducing apparatus, in which the above-described problems have been eliminated.

Another and more specific object of the present invention is to provide a tape cassette loading device which is designed so that a cassette holder, which accommodates and holds a tape cassette which is inserted through an inserting opening in the front of a magnetic recording and/or reproducing apparatus, moves horizontally, then moves obliquely upward so as to move over a capstan, and thereafter moves downward to load the tape cassette into a predetermined position. A cover normally covers the inserting opening, and a space is required to accommodate the cover when it is open. According to the tape cassette loading device of the present invention, it becomes possible to include this space within a distance over which the cassette holder travels vertically to load the tape cassette into the predetermined loading position. As a result, it becomes possible to effectively reduce the thickness (height) of the apparatus.

Still another object of the present invention is to provide a tape cassette loading device in which a gear which drives a continuous rack on the peripheral surface of the cassette holder, is disposed at a height position so as to oppose the side of the tape cassette which is loaded into the predetermined loading position. According to the tape cassette loading device of the present invention, the dimension of a part of the cassette holder, projecting downward from the bottom of the tape cassette which is loaded into the predetermined loading position, may be set to a small value. Thus, it becomes possible to reduce the thickness (height) of the apparatus.

Other objects and further features of the present invention will be apparent from the following detailed description when read in conjunction with the accompanying drawings.

DETAILED DESCRIPTION

Figure 1:
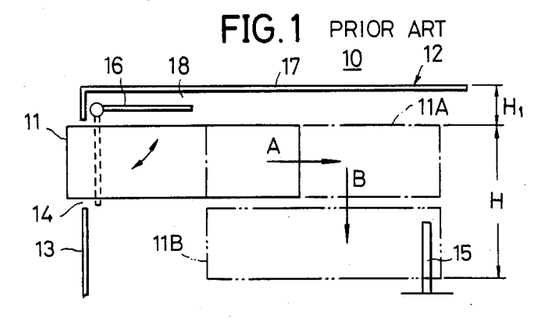
FIG. 1 shows the movements of a tape cassette at the time of loading, in the case of an example of a conventional tape cassette loading device.

In a conventional tape cassette loading device 10 shown in FIG. 1, a tape cassette 11 is partly inserted through an inserting opening 14 which is located in a front panel 13 of a magnetic recording and/or reproducing apparatus 12. Then, a loading motor (not shown) starts to rotate, and automatically moves the partly inserted tape cassette 11 by a loading mechanism (not shown). Hence, the partly inserted tape cassette 11 is moved horizontally in the direction of an arrow A, up to a position 11A. Thereafter, the tape cassette 11 is moved vertically (downward) in the direction of an arrow B, and is loaded into a predetermined loading position 11B. In order to ensure normal loading of the tape cassette 11 into the predetermined loading position 11B, with a capstan 15 entering into the tape cassctte 11 as the tape cassette 11 is lowered from the position 11A, a height dimension H must be reserved between the top of the cassette case 11 which is located at the position 11A and the bottom of the tape cassette 11 which is located at the predetermined loading position 11B. In addition, a cover 16, which normally covers the inserting opening 14, opens by rotating upward when the tape cassette 11 is inserted through the inserting opening 14. The cover 16 is accommodated within a space 18 which is formed between the inserting opening 14 and a top plate 17 of the apparatus 12, when it is open. A height dimension H1 of the space 18 is not included within the height dimension H described above. Consequently, the minimum height dimension of the tape cassette loading device 10 becomes (H+H1), and the height dimension of the tape cassette loading device 10 cannot be reduced.

Figure 2:
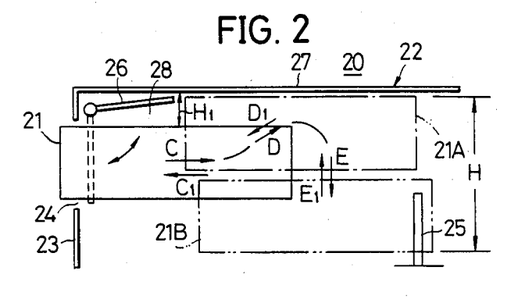
FIG. 2 generally shows the movements of the tape cassette at the time of loading, in an embodiment of a tape cassette loading device according to the present invention.

FIG. 2 generally shows the movements of a tape cassette 21 at the time of the loading, in an embodiment of a tape cassette loading device 20 according to the present invention. When the tape cassette 21 is partly inserted through an inserting opening 24 which is located in a front panel 23 of a magnetic recording and/or reproducing apparatus 22, a loading motor (a motor 60 shown in FIG. 7) starts to rotate and the tape cassette 21 is automatically moved by a loading mechanism (not shown) as will be described later on in the specification. Hence, the partly inserted tape cassette 21 is first moved horizontally in the direction of an arrow C. Subsequent to this first horizontal movement, the tape cassette 21 is moved obliquely upward in the direction of an arrow D, so as to move over a capstan 25, up to a position 21A. Thereafter, the tape cassette 21 is moved downward in the direction of an arrow E, within a space having the height dimension H, and is loaded into a predetermined position 21B. When a cover 26 which normally covers the inserting opening 24 is open, this open cover 26 is accommodated within a space 28 which is formed between the inserting opening 24 and a top plate 27 of the apparatus 22. The height dimension H1 of this space 28 is included within the height dimension H. Hence, the height dimension H1 of the space 28 is independent of the height dimension of the tape cassette loading device 20. In other words, as may be easily understood by comparing the devices shown in FIGS. 1 and 2, the height dimension of the tape cassette loading device 20 can be reduced by an amount which corresponds to the height dimension of the space 18 required in the conventional tape cassette loading device 10.

Next, description will be given with respect to a concrete construction of the tape cassette loading device 20.

Figure 3:
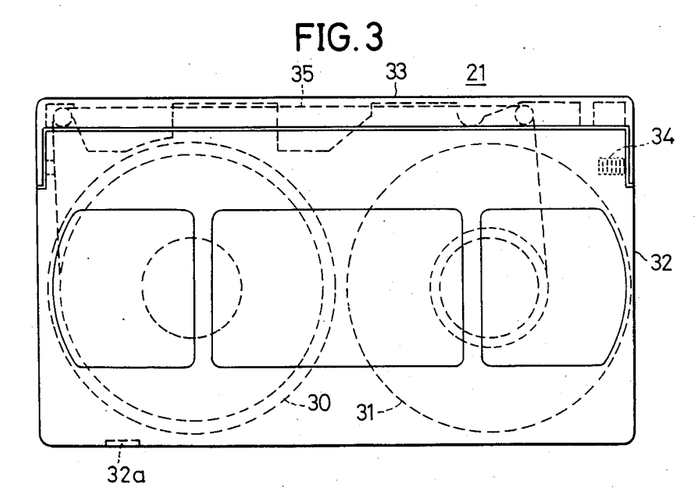
FIGS. 3 and 4 are a plan view and a side view, respectively showing an example of a tape cassette which is employed in the present invention.
Figure 4:
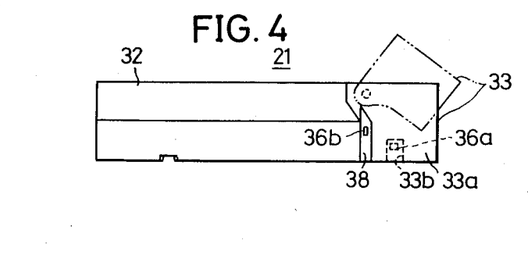
Figure 5:
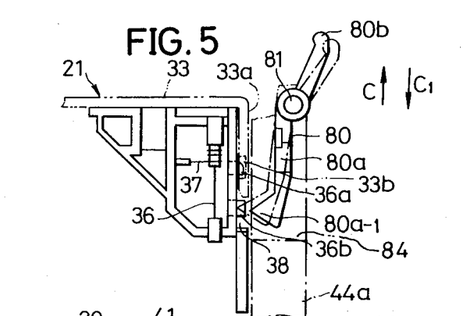
FIG. 5 is an enlarged view showing a mechanism for locking a lid of the tape cassette.

First, the tape cassette 21 will be briefly described. As shown in FIGS. 3 and 4, the tape cassette 21 comprises a cassette case 32 which accommodates a supply reel 30 and a take-up reel 31, and a lid 33 which is located at the front of the cassette case 32. The lid 33 can open and close, and is urged by a torsion spring 34 to rotate in a closing direction. Accordingly, the lid 33 is normally closed to protect a magnetic tape 35 which runs along the front of the cassette case 32. In addition, the lid 33 is locked in its closed position. As shown in FIG. 5, a right side wall 33a of the lid 33 has an engaging depression 33b, and a locking claw 36a of a lock plate 36 engages with the engaging depression 33b to lock the lid 33 in its closed position. The lock plate 36 further has a lock releasing projection 36b, and is urged by a torsion spring 37 in a direction so as to lock the lid 33 in its closed position. The lock releasing projection 36b projects within a depression 38 which is formed on the side of the tape cassette 21.

The tape cassette loading device 20 has a construction shown in FIGS. 6 through 10. Right and left parts of the tape cassette loading device 20 are substantially constructed symmetrical to each other. Accordingly, the parts which constitute the right part of the tape cassette loading device 20, and those corresponding parts which constitute the left part of the tape cassette loading device 20, are respectively designated by the same reference numerals with a suffix "a" for the right parts and with a suffix "b" for the left parts.

Right and left support plates 40a and 40b and a top plate 41, which is disposed across these support plates 40a and 40b, constitute a frame which has an inverted U-shape viewed from the front. This inverted U-shape frame is secured to a chassis 42. A cassette holder 43 is provided movable within the inverted U-shape frame, as will be described hereinafter.

The cassette holder 43 is a frame which is constituted from right and left side plates 44a and 44b, and a bottom plate 45 and a top plate 46 which are respectively disposed across the side plates 44a and 44b. A space is formed inside the cassette holder 43, for receiving the tape cassette 21.

Figure 8:
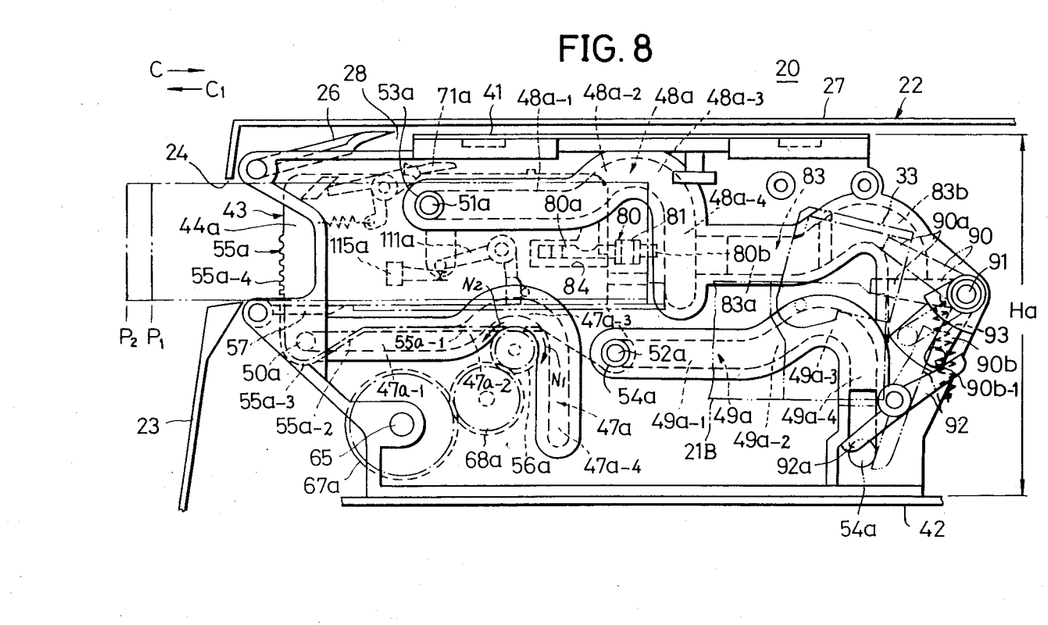
FIG. 8 is a right side view of the device shown in FIG. 6, with a cassette holder driving system omitted.
Figure 10:
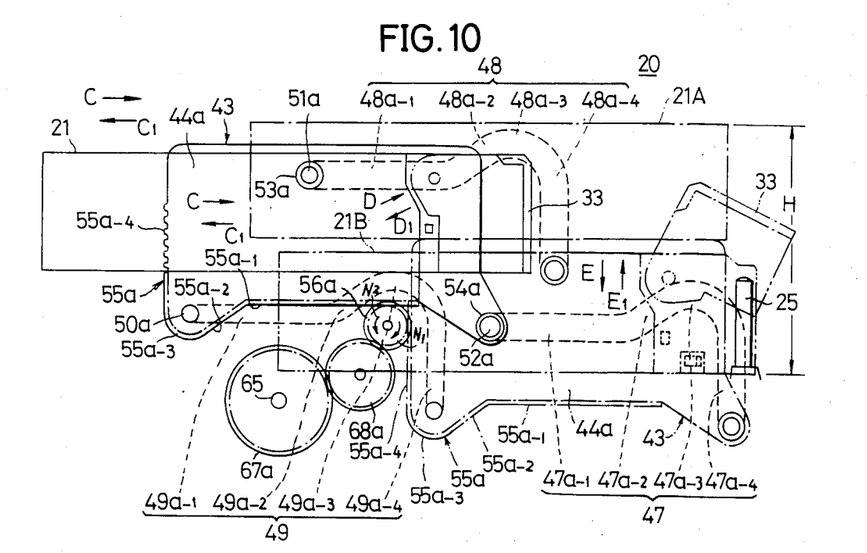
FIG. 10 shows the movements of the cassette holder in the device shown in FIG. 8 at the time of loading the tape cassette.

Three curved guide grooves 47a, 48a, and 49a are formed on the support plate 40a, and three curved guide grooves 47b, 48b, and 49b are formed on the support plate 40b. As shown in FIGS. 8 and 10, the guide grooves 47a, 48a, and 49a respectively comprise horizontal groove portions 47a-1, 48a-1, and 49a-1, sloping groove portions 47a-2, 48a-2, and 49a-2 which slope upward, arcuate groove portions 47a-3, 48a-3, and 49a-3, and vertical groove portions 47a-4, 48a-4, and 49a-4. The horizontal groove portion 47a-1, the sloping groove portion 47a-2, the arcuate groove portion 47a-3, and the vertical groove portion 47a-4 are continuous. In addition, the grooves 47a, 48a, and 49a are parallel to each other. As shown in FIG. 8, the guide grooves 47b, 48b, and 49b on the left support plate 40b similarly and respectively comprise horizontal groove portions 47b-1, 48b-1, and 49b-1, sloping groove portions 47b-2, 48b-2, and 49b-2 which slope upward, arcuate groove portions 47b-3, 48b-3, and 49b-3, and vertical groove portions 47b-4, 48b-4, and 49b-4.

Figure 9:
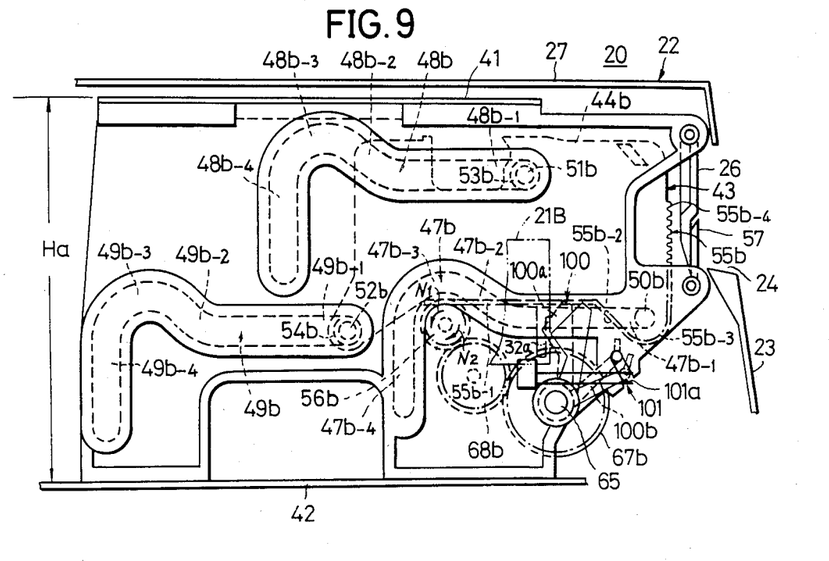
FIG. 9 is a left side view of the device shown in FIG. 6.

Pins 50a, 51a, and 52a are located on the side plate 44a of the cassette holder 43, at positions corresponding to the vertexes of an imaginary triangle as shown in FIG. 8. Rollers 53a and 54a are respectively provided on the pins 51a and 52a. On the other hand, pins 50b, 51b, and 52b are located on the other side plate 44b as shown in FIG. 9, and rollers 53b and 54b are respectively provided on the pins 51b and 52b. The pin 50a and the rollers 53a and 54a are fitted into the respective guide grooves 47a, 48a, and 49a of the support plate 40a, while the pin 50b and the rollers 53b and 54b are fitted into the respective guide grooves 47b, 48b, and 49b of the support plate 40b. Accordingly, the cassette holder 43 is supported at three points on both sides thereof, and is freely movable under the guidance of the guide grooves 47a, 48a, 49a, 47b, 48b, and 49b. In a state before the tape cassette 21 is loaded into the recording and/or reproducing apparatus 22, the pin 50a and the rollers 53a and 54a are respectively guided at the ends of the horizontal groove portions 47a-1, 48a-1, and 49a-1, while the pin 50b and the rollers 53b and 54b, are respectively guided by the ends of the horizontal groove portions 47b-1, 48b-1, and 49b-1. Thus, the cassette holder 43 assumes a position opposing the inserting opening 24.

A rack 55a is formed on the lower edge of the side plate 44a and on a side edge of the side plate 44a at the inserting opening 24. Similarly, a rack 55b is formed on the lower edge and a side edge of the side plate 44b. The racks 55a and 55b have shapes symmetrical to the respective guide grooves 47a and 47b. These racks 55a and 55b respectively comprise horizontal rack portions 55a-1 and 55b-1, sloping rack portions 55a-2 and 55b-2 which slope downward, arcuate rack portions 55a-3 and 55b-3, and vertical rack portions 55a-4 and 55b-4 which extend upward. The horizontal rack portions 55a-1 and 55b-1, the sloping rack portions 55a-2 and 55b-2, the arcuate rack portions 55a-3 and 55b-3, and the vertical rack portions 55a-4 and 55b-4 are respectively continuous with each other. In the state before the tape cassette 21 is loaded into the recording and/or reproducing apparatus 22, the ends of the horizontal rack portions 55a-1 and 55b-1 mesh with respective pinions 56a and 56b as shown in FIGS. 8 and 9. The pinions 56a and 56b are respectively disposed near the inserting opening 24 along the height direction of these pinions 56a and 56b, due to the relationship between the shape of the racks 55a and 55b.

Figure 7:
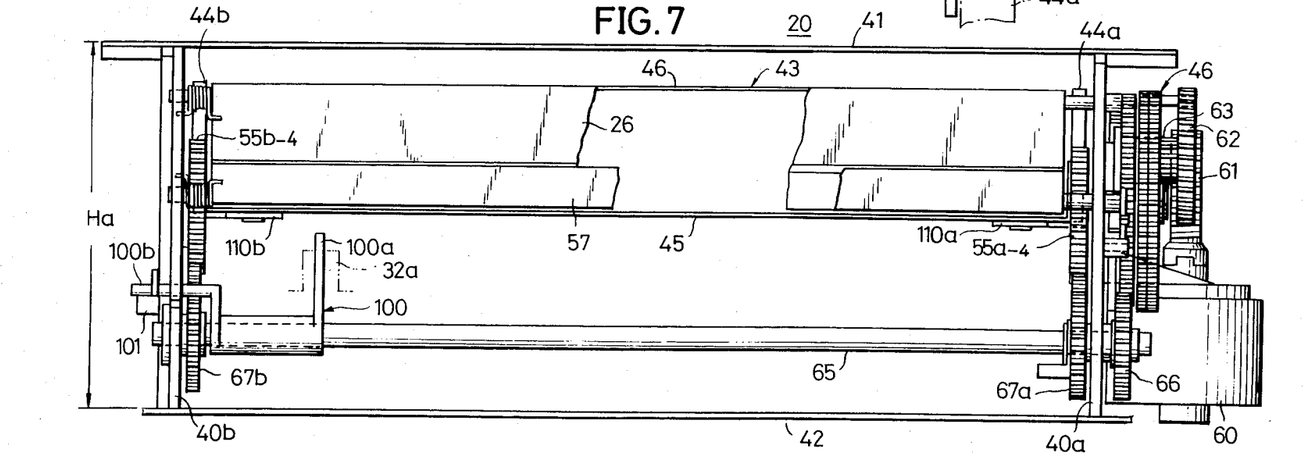
FIG. 7 is a front view of the device shown in FIG. 6, with a part of an inserting opening cover cut away.

In addition, the cover 36 which is rotatably supported at both ends thereof by the upper parts of the support plates 40a and 40b, and a lower cover 57 which is rotatably supported at both ends thereof by the lower part of the support plates 40a and 40b, are respectively disposed in the vicinity of the inserting opening 24. In the state before the tape cassette 21 is loaded into the recording and/or reproducing apparatus 22, the covers 26 and 57 cooperate to cover the inserting opening 24 as shown in FIGS. 7 and 9.

Next, description will be given with respect to a driving mechanism which moves the cassette holder 43.

The driving motor 60 is mounted on the outer side of the support plate 40a. A worm 61 is fixed to a rotary shaft of this motor 60. A worm gear 62 unitarily comprises a small-diameter gear 63, and this worm gear 62 meshes with the worm 61. The small-diameter gear 63 meshes with a speed-reducing gear group 64. A connecting shaft 65 is rotatably supported between the support plates 40a and 40b. A gear 66 (FIG. 7) is fixed to the connecting shaft 65 on the outer side of the support plate 40a. Further, a gear 67a is fixed to the connecting shaft 65 on the inner side of the support plate 40a, and a gear 67b is fixed to the connecting shaft 65 on the inner side of the support plate 40b. The gear 66 meshes with an output side of the gear group 64, and the gears 67a and 67b mesh with respective gears 68a and 68b which are supported on the inner surfaces of the support plates 40a and 40b. These gears 68a and 68b mesh with the respective pinions 56a and 56b.

By taking into account the location of a detecting lever which detects an erroneous erasure preventing tab which will be described later, the demand to reduce the thickness (height) of the tape cassette loading device 20, and the like, the connecting shaft 65 is disposed at a position so that the bottom of the tape cassette 21 will not hit the connecting shaft 65 as the tape cassette 21 is lowered into the predetermined loading position 21B, and so that the connecting shaft 65 is close to the bottom of the tape cassette 21 which is in the predetermined loading position 21B.

Next, description will be given with respect to the operation of the tape cassette loading device 20 which is constructed as described heretofore.

When the tape cassette 21 is inserted through the inserting opening 24 with the lid 33 of the tape cassette 21 facing the inserting direction as shown in FIG. 8, the covers 26 and 57 are pushed by the inserted tape cassette 21. The covers 26 and 57 are thus respectively rotated and opened, and assume substantially horizontal rotational positions. When the tape cassette 21 passes through the inserting opening 24 and reaches a predetermined inserting position P1 inside the cassette holder 43, detecting switches 115a and 115b are turned ON, and the motor 60 starts to rotate in the forward direction. The detecting switches 115a and 115b will be described later on in the specification. The rotation of the motor 60 is transmitted to the connecting shaft 65, through the worm 61, the worm gear 62, the small-diameter gear 63, the gear group 64, and the gear 66. Further, the rotation of the connecting shaft 65 is transmitted to the pinion 56a through the gears 67a and 68a, and to the pinion 56b through the gears 67b and 68b. As a result, the pinions 56a and 56b rotate in the direction of an arrow N1.

Accordingly, the cassette holder 43 is simultaneously driven at both sides thereof, and moves in the following manner. That is, the cassette holder 43 is driven by the horizontal rack portions 55a-1 and 55b-1 thereof, and the cassette holder 43 is guided by the horizontal groove portions 47a-1, 48a-1, 49a-1, 47b-1, 48b-1, and 49b-1, so as to move horizontally in the direction of the arrow C. Subsequent to this horizontal movement, the cassette holder 43 is driven by the sloping rack portions 55a-2 and 55b-2 thereof, and the cassette holder 43 is guided by the sloping groove portions 47a-2 and 47b-2 and the like, so as to move in the direction of the arrow D. Thus, the tape cassette 21 reaches the position 21A (FIGS. 2 and 10) where the part of the tape cassette 21 in the vicinity of the lid 33 thereof is located above the capstan 25. Thereafter, the cassette holder 43 is driven by the arcuate rack portions 55a-3 and 55b-3 thereof, and the cassette holder 43 is guided by the arcuate groove portions 47a-3 and 47b-3 and the like. The cassette holder 43 is further driven by the vertical rack portions 55a-4 and 55b-4 thereof, and the cassette holder 43 is guided by the vertical groove portions 47a-4 and 47b-4 and the like, so as to move in the direction of the arrow E. Hence, the tape cassette 21 moves downward within the space which has the height dimension H, and finally reaches the predetermined loading position 21B. The lid 33 is open, and the reels 30 and 31 fit over respective reel bases 69 and 70, in the state where the tape cassette 21 is loaded into the predetermined loading position 21B.

Clamp arms 71a and 71b push the top plate of the tape cassette 21, so that the tape cassette 21 is held in a state accommodated within the cassette holder 43. Thus, the tape cassette 21 moves together with the cassette holder 43. In addition, the cassette holder 43 stably moves in its horizontal state, because the cassette holder 43 is supported at three points on both sides thereof. When the cassette holder 43 reaches the predetermined loading position 21B, a detecting switch (not shown) is activated to cut off the supply of current to the motor 60 and accordingly stop the rotation of the motor 60. In this state, the ends of the vertical rack portions 55a-4 and 55b-4 mesh with the respective pinions 56a and 56b. For this reason, the cassette holder 43 is stably maintained in the predetermined loading position 21B.

As may be understood from the description given heretofore, the cassette holder 43, that is, the tape cassette 21, moves up and down within the space which has the height dimension H as shown in FIG. 10. The height dimension H1 of the space 28 which accommodates the open cover 26 corresponds to the vertical displacement of the tape cassette 21 as the tape cassette 21 gradually moves upward to assume the position above the capstan 25. Thus the height dimension H1 of the space 28, is included within the height dimension H of the space in which the tape cassette 21 moves. In other words, a height dimension Ha of the tape cassette loading device 20 may be set according to the moving range of the cassette holder 43 (tape cassette 21), without considering the height dimension of the space 28. Therefore, the upper part of the tape cassette loading device 20 is designed so that the height dimension Ha can be effectively reduced.

The vertical rack portions 55a-4 and 55b-4 respectively extend up to a height position which is located within a cassette accommodating space within the cassette holder 43. For this reason, the pinions 56a and 56b are respectively located at a height position so as to oppose the sides of the tape cassette 21 which has moved to the predetermined loading position 21B, as shown in FIGS. 8, 9, and 10. Accordingly, the pinions 56a and 56b and the gears which are provided in the preceding stage, are disposed within the vertical moving range of the cassette holder 43. Therefore, the provision of the pinions 56a and 56b and the like will not increase the height dimension Ha of the tape cassette loading device 20. The lower part of the tape cassette loading device 20 is thus also designed so that the height dimension Ha can be effectively reduced.

When an eject operation is carried out, the motor 60 rotates in the reverse direction. Thus, the pinions 56a and 56b rotate in the direction of an arrow N2, and the cassette holder 43 moves together with the tape cassette 21, in a direction which is opposite to the moving direction at the time of the loading operation. In other words, the tape cassette 21 is unloaded from the predetermined loading position 21B, and moves in the directions of arrows E1, D1, and C1.

A part which includes the sloping groove portion 47a-2 and the arcuate groove portion 47a-3 of the guide groove 47a, constitutes an essential part of the present invention. This essential part acts on the cassette holder 43, so that the cassette holder 43 moves upward and also horizontally. The design of this essential part is not limited to those of the sloping groove portion 47a-2 and the arcuate groove portion 47a-3, as long as similar functions are achieved. Satisfactory effects can be obtained if this essential part is a continuous groove portion which has a substantially inverted U-shape. The shapes of the sloping rack portion 55a-2 and the arcuate rack portion 55a-3 of the rack 55a are determined by the shape of the above essential part.

Next, description will be given with respect to a lock releasing mechanism which releases the locking with respect to lid 33 of the tape cassette 21 during the process of loading the tape cassette 21 into the recording and/or reproducing apparatus 22, by referring to FIGS. 6 through 8 in particular.

A lock releasing lever 80 is supported on a pin 81. This pin 81 is located at an inner part of the right side plate 44a of the casserte holder 43. The lock releasing lever 80 is urged to rotate clockwise in FIG. 6, by a torsion spring 82. The lock releasing lever 80 comprises an arm part 80a one side thereof, and an arm part 80b on the other side thereof. A triangular projection 80a-1 is formed on the tip end of the arm part 80a. The arm part 80b is guided by a cam 83 which is formed on the inner surface of the support plate 40a. In the state before the tape cassette 21 is loaded into the recording and/or reproducing apparatus 22, the arm part 80b is guided by a projection 83a of the cam 83, and the lock releasing lever 80 is rotated counterclockwise against the force which is exerted by the torsion spring 82 as shown in FIG. 6. Furthermore, the projection 80a-1 enters within a cutout 84 in the side plate 44a as shown in FIG. 5. Hence, when inserting the tape cassette 21 into the cassette holder 43, it is unnecessary to push the projection 80a-1 out of the way to the side, and the tape cassette 21 can be inserted smoothly into the cassette holder 43. In addition, the cassette tape 21 can also be extracted smoothly from the cassette holder 43. When the cassette case 21 is inserted into the cassette holder 43, the right side wall 33a of the lid 33 will not make contact with the projection 80a-1. Thus, scratches will not be formed on the right side wall 33a.

The cam 83 is formed along a moving locus of the cassette holder 43. The projection 83a of the cam 83 is formed in correspondence with a horizontal portion of this moving locus, and a depression of the cam 83 is formed in correspondence with arcuate and vertical parts of this moving locus. Accordingly, during the process in which the cassette holder 43 undergoes an arcuate movement and a vertical movement in continuity with a horizontal movement, the arm part 80b is guided by the depression 83b. Moreover, the lock releasing lever 80 rotates clockwise as indicated by a two-dot chain line in FIG. 5, and the projection 80a-1 projects within the cassette holder 43 to push the lock releasing projection 36b. As a result, the lock plate 36 rotates and the locking claw 36a escapes from the engaging depression 33b, so as to release the locking with respect to the lid 33.

Next, description will be given with respect to a mechanism which opens the lid 33, which is released from its locked state at the time of loading the tape cassette 21 into the recording and/or reproducing apparatus 22, by referring to FIGS. 6 and 8.

A lid opening member 90 is supported on a pin 91 which is located on the inner surface of the support plate 40a at an inner part thereof. The lid opening member 90 has a lid opening arm 90a on the left end thereof and an arm 90b on the right end thereof. A lever 92 is rotatably supported on the outer surface of the support plate 40a. In the state before the tape cassette 21 is loaded into the recording and/or reproducing apparatus 22, the lid opening member 90 is rotated counterclockwise by the force which is exerted by a spring 93 and assumes the rotational position shown in FIG. 8. A projection 90b-1 of the arm 90b engages the lever 92 and rotates the lever 92 clockwise. The arm 92a opposes the vertical groove portion 49a-4 of the guide groove 49a.

In a final stage of the loading operation in which the cassette holder 43 moves downward and loads the tape cassette 21 into the predetermined loading position 21B, the roller 54a pushes an arm part 92a of the lever 92. Accordingly, the lever 92 rotates counterclockwise as indicated by a two-dot chain line in FIG. 8. The lid opening member 90 rotates clockwise. Thus, the arm 90a engages the lid 33 as it rotates and opens the lid 33.

The lid opening member 90 and the lever 92 are both located on the support plate 40a. Compared to a case where the lid opening member 90 and the lever 92 are supported on a bracket which ris secured on the chassis 42, the above construction provides an improved positional accuracy of the lid opening member 90 and the lever 92 with respect to the tape cassette 21 which is in the predetermined loading position 21B. Hence, the lid 33 can be opened stably. Further, the recording and/or reproducing apparatus 22 can be assembled with more ease. In addition, an empty space will be formed below the lid opening member 90, and other mechanisms may be fitted within this empty space.

Next, description will be given with respect to a mechanism which detects an erroneous erasure preventing tab, by referring to FIGS. 6, 7, and 9 in particular.

A detecting member 100 which detects an erroneous erasure preventing tab, is rotatably supported on the left end of the connecting shaft 65. This detecting member 100 comprises a detecting arm portion 100a on the right end thereof, and a switching arm portion 100b on the left end thereof. A detecting switch 101 is mounted on the support plate 40b. A leaf 101a of the detecting switch 101 engages with the switching arm portion 100b of the detecting member 100, and urges the detecting member 100 counterclockwise in FIG. 9. Normally, the detecting arm portion 100a assumes a vertical rotational position, and the detecting switch 101 is OFF.

The detecting arm portion 100a opposes an erroneous erasure preventing tab 32a which is located on the rear surface of the tape cassette 21 which is in the predetermined loading position 21B. When the tape cassette 21 has the tab 32a, the detecting arm portion 100a is pushed by the tab 32a, and the detecting member 100 rotates clockwise as indicated by a two-dot chain line in FIG. 9. As a result, the leaf 101a of the detecting switch 101 is pushed, and the detecting switch 101 is turned ON. In this case, it is detected that a recording can be carried out with respect to the tape cassette 21 which is in the predetermined loading position 21B. On the other hand, the tab 32a of the tape cassette 21 is removed when the recorded content on the tape is not to be erased. Hence, when the tape cassette 21 which is in the predetermined loading position 21B does not have the tab 32a, the detecting arm portion 100a enters within the tape cassette 21, and the detecting member 100 remains in the original rotational position. In this case, the detecting switch 101 remains OFF, and it is detected that the a recording cannot be carried out with respect to the tape cassette 21 which is in the predetermined loading position 21B.

The detecting member 100 is supported on the connecting shaft 65 as described above. For this reason, compared to a case where the detecting member 100 is supported on a bracket which is secured on the chassis 42, the effects will be the same as if the lid opening member 90 is supported on the pin 91. That is, the positional accuracy of the detecting member 100 with respect to the tape cassette 21 which is in the predetermined loading position 21B is improved, and the assembling of the recording and/or reproducing apparatus 22 is facilitated.

Next, description will be given with respect to a mechanism which allows the user to easily hold the tape cassette 21 which is ejected from the inserting opening 24, by referring to FIGS. 11A through 11D and 12A through 12D.

Figure 6:
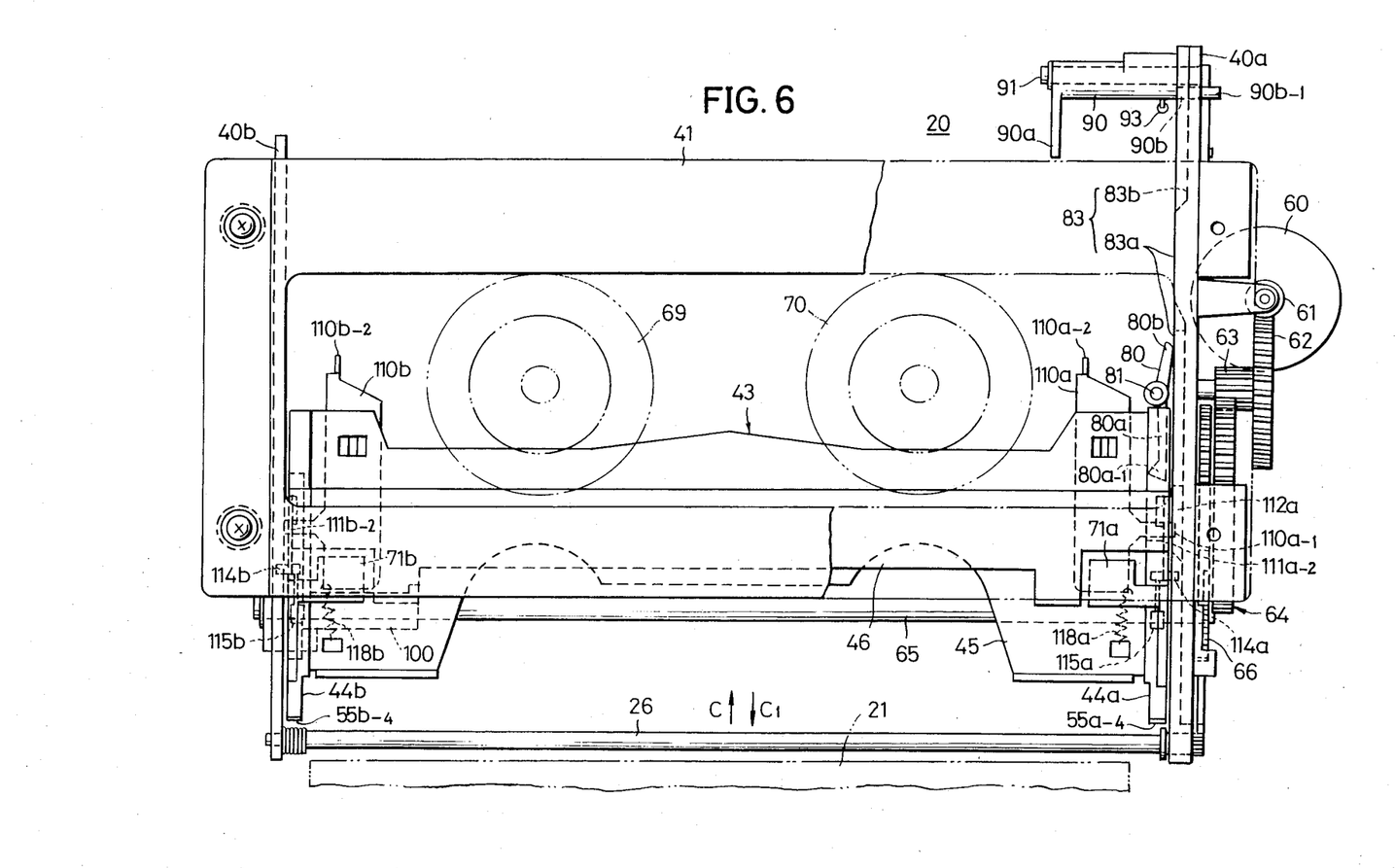
FIG. 6 is a plan view, with a part cut away, showing an embodiment of a tape cassette loading device according to the present invention.

As shown in FIGS. 6 and 7, cassette push-out members 110a and 110b are slidably provided on the lower surface of the bottom plate 45 of the cassette holder 43, on right and left ends of the bottom plate 45. These cassette push-out members 110a and 110b are slidable in the directions of the arrows C and C1. As will be described later on in the specification, these cassette push-out members 110a and 110b operate to push the tape cassette 21 out of the cassette holder 43 at the time of an ejecting operation, by the operations of switch arms 111a and 111b and cams 112a and 112b shown in FIGS. 11A through 11D.

Figure 11A:
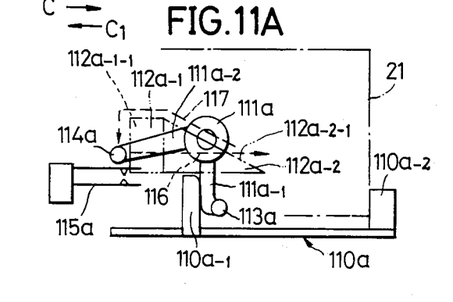
FIGS. 11A through 11D and 12A through 12D are side views and plan views, respectively showing stages of the operating states of a switch arm and a cassette push-out member at the time of loading the tape cassette and at the time of ejecting the tape cassette.
Figure 11B:
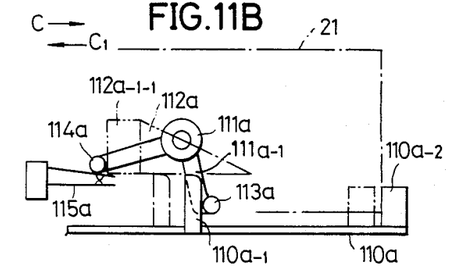
Figure 12A:
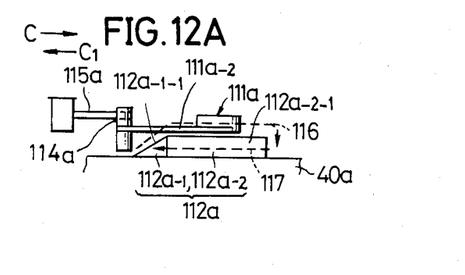
Figure 12B:
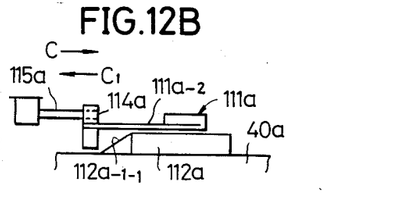

As shown in FIGS. 8, 11A, and 12A, the switch arm 111a is rotatably supported on the side plate 44a of the cassette holder 43. The switch arm 111a has an L-shape, and comprises an arm portion 111a-1 and a resilient spring arm portion 111a-2. A pin 113a is located on the tip end of the arm portion 111a-1, and a pin 114a is located on the tip end of the spring arm portion 111a-2. The pin 113a opposes a bent portion 110a-1 of the cassette push-out member 110a. The pin 114a projects on both sides of the spring arm portion 111a-2, and opposes the cam 112a and the detecting switch 115a. The cam 112a is formed on the inner surface of the support plate 40a, and has a shape which is a combination of a cam portion 112a-1 which has a triangular column shape in the plan view and a cam portion 112a-2 which has a flat triangular column shape in the side view. As will be described hereinafter, the pin 114a is guided by the cam 112a. The pin 114a moves along a moving locus 116 in an initial stage of the tape cassette loading operation, and moves along a moving locus 117 in a final stage of the tape cassette ejecting operation.

When the tape cassette 21 is inserted into the cassette holder 43 up to the inserting position P1, the tape cassette 21 engages and pushes bent portions 110a-2 and 110b-2 which are located on the tip ends of the cassette push-out members 110a and 110b. As a result, the cassette push-out members 110a and 110b slide in the direction of the arrow C against the forces exerted by springs 118a and 118b. In addition, the bent portion 110a-1 engages with the switch arm 111a and rotates the switch arm 111a counterclockwise. Accordingly, the switch 115a is pushed by the pin 114a and is turned ON. Similarly, the switch 115b on the other side is turned ON. When both of these switches 115a and 115b are turned ON, the motor 60 starts to rotate, and the tape cassette loading operation described before is started.

Figure 11C:
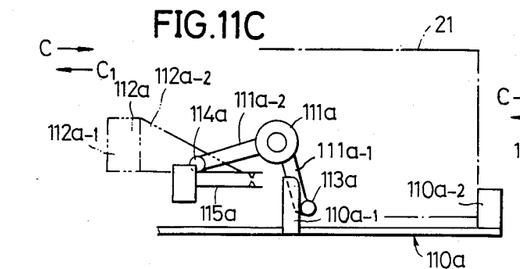
Figure 12C:
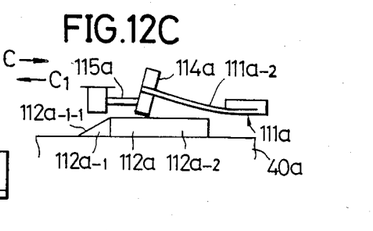

As the cassette holder 43 moves in the direction of the arrow C1 together with the tape cassette 21, the pin 114a moves along the moving locus 116 by riding over the cam 112a along a sloping surface 112a-1-1, accompanying the deformation of the spring arm portion 111a-2 as shown in FIGS. 11C and 12C. When the pin 114a rides over the cam 112a, the spring arm portion 111a-2 returns to its original linear state.

Figure 11D:
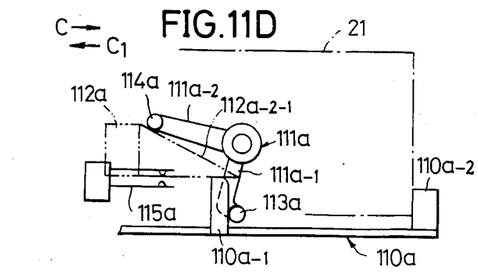
Figure 12D:
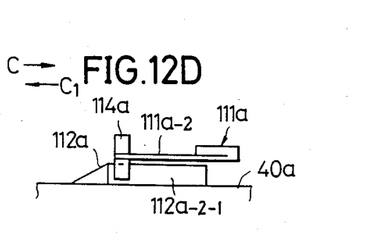

On the other hand, as the cassette holder 43 moves in the direction of the arrow C1 in a final stage of the tape cassette ejecting operation, the pin 114a rides over a sloping surface 112a-2-1 of the cam portion 112a-2, as shown in FIGS. 11D and 12D. Thus, the switch arm 111a rotates clockwise. As the switch arm 111a rotates clockwise, the pin 113a engages with the bent portion 110a-1 of the cassette push-out member 110a and moves the cassette push-out member 110a in the direction of the arrow C1. The bent portion 110a-2 engages the tape cassette 21 and pushes the tape cassette 21 out of the cassette holder 43. As a result, when the tape cassette ejecting operation is completed, the tape cassette 21 will have moved past the inserting position P1 and ejected to a position P2 shown in FIG. 8. It is easier for the user to hold and extract the ejected tape cassette 21 which is in the position P2. After the tape cassette ejecting operation is completed, the switch arm 111a returns to the state shown in FIGS. 11A and 12A. The other switch arm 111b operates similarly as the switch arm 111a.

Further, the present invention is not limited to these embodiments, but various variations and modifications may be made without departing from the scope of the present invention.

What is claimed is:

1. A tape cassette loading device in a magnetic recording and/or reproducing apparatus, said recording and/or reproducing apparatus having a member which relatively enters within a tape cassette as the tape cassette is loaded into a predetermined loading position inside the recording and/or reproducing apparatus, said member being required to carry out recording and reproduction, said tape cassette loading device comprising:

a cassette holder for accommodating and holding the tape cassette which is inserted therein, said cassette holder being movable together with the inserted tape cassette between a cassette inserting position where the tape cassette is inserted and the predetermined loading position where said member relatively enters within the tape cassette;

guiding means for guiding said cassette holder so that said cassette holder undergoes in sequence a horizontal frontward movement of the cassette holder from the cassette inserting position, a subsequent obliquely upward movement of the cassette holder for avoiding the horizontal frontward movement from being interfered with by said member, and a subsequent downward movement of the cassette holder to the predetermined loading position, said horizontal frontward movement coinciding with the direction in which the tape cassette is inserted into the cassette holder;

driving means which starts to operate when the tape cassette is inserted into the cassette holder which is in the cassette inserting position; and tape cassette loading means driven by said driving means, said tape cassette loading means moving said cassette holder under guidance of said guiding means to the predetermined loading position together with the tape cassette which is accommodated within the cassette holder.

2. A tape cassette loading device as claimed in claim 1 in which said guiding means comprises horizontal guide portions which extend in the direction in which the tape cassette is inserted into the cassette holder, sloping guide portions which extend obliquely upward, said sloping guide portions being continuous with the respective horizontal guide portions, and vertical guide portions which extend downward, said vertical guide portions being continuous with the respective sloping guide portions.

3. A tape cassette loading device as claimed in claim 2 which further comprises a pair of support plates which are disposed on both sides of the cassette holder, said horizontal, sloping, and vertical guide portions of said guide means being formed as continuous guide grooves on said support plates.

4. A tape cassette loading device as claimed in claim 3 in which three of said guide grooves are formed on each of said support plates, and said cassette holder is guided at three points on both sides thereof by said guide grooves.

5. A tape cassette loading device as claimed in claim 2 in which said cassette holder comprises side plates, and said tape cassette loading means comprises pinions which are located at predetermined positions and driven by said driving means, and racks which are formed on peripheral edges of the side plates of the cassette holder, said pinions are respectively located at a height position corresponding to the height position of the tape cassette which is in the predetermined loading position, said racks respectively have a shape which is in conformance with the shape of said guide means, and comprise horizontal rack portions which extend in a direction opposite to the direction in which the tape cassette is inserted into the cassette holder, sloping rack portions which extend obliquely downward, said sloping rack portions being continuous with the respective horizontal rack portions, and vertical rack portions which extend upward, said vertical rack portions being continuous with the respective sloping rack portions.

6. A tape cassette loading device as claimed in claim 1 in which said tape cassette comprises a cassette case which accommodates a magnetic tape, a rotatable lid which is located at the front of the cassette case, and a locking mechanism for locking the lid in a closed position where the lid covers the front of the cassette case, said cassette holder comprises side plates, and said tape cassette loading device further comprises a lock releasing mechanism which has a lock releasing member and a release mechanism, said lock releasing member being located on the side plate of the cassette holder and assuming a position receded within the side plate when the cassette holder is in the cassette inserting position, said release mechanism causing said lock releasing member to project within the cassette holder and releasing the locking operation of said locking mechanism in the tape cassette as the cassette holder which is inserted with the tape cassette moves toward the predetermined loading position.

7. A tape cassette loading device as claimed in clarm 1 in which said tape cassette comprises a cassette case which accommodates a magnetic tape, and a rotatable lid which is located at the front of the cassette case, and said tape cassette loading device further comprises support plates for slidably supporting the cassette holder, said support plates being disposed to oppose respective side surfaces of the cassette holder, and a lid opening mechanism which is located on the support plate, said lid opening mechanism undergoing a rotation and engaging with said lid to open said lid as the cassette holder moves downward to the predetermined loading position.

8. A tape cassette loading device as claimed in claim 1 in which said tape cassette comprises an erroneous erasure preventing tab located at the rear thereof, and said tape cassette loading device further comprises support plates for slidably supporting the cassette holder, said support plates being disposed to oppose respective side surfaces of the cassette holder, a shaft for transmitting the rotation of said driving means to said tape cassette loading means, and a detecting member which is supported on said shaft, said detecting member detecting the existence of said erroneous erasure preventing tab on the tape cassette which is in the predetermined loading position.

9. A tape cassette loading device as claimed in claim 1 which further comprises cassette push-out members which are slidably provided on the cassette holder and slide in a predetermined direction to push the tape cassette out of the cassette holder, and a mechanism for moving said cassette push-out members in said predetermined direction as the cassette holder moves from the predetermined loading position toward the cassette inserting position.

* * * * *